(12) United States Patent
Johnson et al.

(10) Patent No.: US 6,870,995 B2
(45) Date of Patent: Mar. 22, 2005

(54) HIGH FIBER COUNT OPTICAL FIBER CABLE WITH BUFFER TUBES AROUND CENTRAL STRENGTH MEMBER

(75) Inventors: J. Peter Johnson, Lexington, SC (US); Robert S. Aull, Lexington, SC (US); Mike Petryszak, Lexington, SC (US)

(73) Assignee: Pirelli Cables and Systems LLC, Columbia, SC (US)

( * ) Notice: Subject to any disclaimer, the term of this patent is extended or adjusted under 35 U.S.C. 154(b) by 6 days.

(21) Appl. No.: 09/899,329

(22) Filed: Jul. 5, 2001

(65) Prior Publication Data

US 2003/0059182 A1 Mar. 27, 2003

(51) Int. Cl.[7] .............................................. G02B 6/44
(52) U.S. Cl. ...................... 385/112; 385/109; 385/113; 385/114
(58) Field of Search .................................. 385/109–115

(56) References Cited

U.S. PATENT DOCUMENTS

| | | |
|---|---|---|
| 4,038,489 A | 7/1977 | Stenson et al. |
| 4,072,398 A | 2/1978 | Larsen et al. |
| 4,078,853 A | 3/1978 | Kempf et al. |
| 4,568,144 A | 2/1986 | Occhini et al. |
| 4,647,151 A | 3/1987 | Grogl et al. |
| 4,684,214 A | 8/1987 | Goldmann et al. |
| 4,715,678 A | 12/1987 | Johnson et al. |
| 4,746,190 A | 5/1988 | Oestreich et al. |
| 4,822,133 A | 4/1989 | Peacock |
| 4,906,067 A | 3/1990 | Mayr et al. |
| 5,046,815 A | 9/1991 | Cain et al. |
| 5,179,611 A | 1/1993 | Umeda et al. |
| 5,389,442 A | 2/1995 | Arroyo et al. |
| 5,621,841 A * | 4/1997 | Field ............................ 385/113 |
| 5,630,003 A | 5/1997 | Arroyo |
| 5,684,904 A * | 11/1997 | Bringuier et al. ........... 385/109 |
| 5,715,344 A | 2/1998 | Seo et al. |
| 5,822,484 A | 10/1998 | Arroyo |
| 5,848,212 A | 12/1998 | Wagman |

(List continued on next page.)

FOREIGN PATENT DOCUMENTS

| | | | |
|---|---|---|---|
| EP | 0495241 | 12/1991 | ............ G02B/6/44 |
| EP | 0777141 | 11/1996 | ............ G02B/6/44 |
| EP | 0874261 | 4/1998 | ............ G02B/6/44 |
| EP | 0889345 | 6/1998 | ............ G02B/6/44 |
| JP | 55108604 A * | 8/1980 | ............ G02B/5/16 |
| JP | 63075714 A * | 4/1988 | ............ G02B/6/44 |

OTHER PUBLICATIONS

Telecordia Technologies "GR–20–CORE: Generic Requirements for Optical Fiber and Optical Fiber Cable" Issue 2, Jul. 1998, p. 2–3, section 2.1.2.2.*

(List continued on next page.)

*Primary Examiner*—Edward J. Glick
*Assistant Examiner*—Krystyna Suchecki
(74) *Attorney, Agent, or Firm*—Norris, McLaughlin & Marcus

(57) ABSTRACT

Optical fiber cable with a central strength member structure and with four or five buffer tubes each loosely receiving optical fiber ribbons in a stack and is disposed around and contacting the strength member. The optical fiber count is in excess of 1000 and the fill factor is not greater than 85% in a two inch duct. Each buffer tube contacts adjacent buffer tubes, and the buffer tubes are encircled by a jacket. Optionally, spaces bounded by pairs of buffer tubes and the jacket have optical fibers therein and can also include flexible longitudinal strength members and/or water blocking filaments. Preferably, the strength member structure and/or the buffer tubes are encircled by a water blocking tape. The optical fiber ribbons in the stacks can include different numbers of fibers, and hence, can have different width.

30 Claims, 3 Drawing Sheets

U.S. PATENT DOCUMENTS

| | | | |
|---|---|---|---|
| 5,857,051 A | | 1/1999 | Travieso et al. |
| 6,002,824 A | | 12/1999 | Paborn et al. |
| 6,014,487 A | * | 1/2000 | Field et al. ................. 385/110 |
| 6,192,178 B1 | * | 2/2001 | Logan et al. ............... 385/109 |
| 6,658,187 B2 | * | 12/2003 | Militaru ...................... 385/112 |
| 2001/0007604 A1 | * | 7/2001 | Lail ........................... 385/114 |

OTHER PUBLICATIONS

The Status and Future of High Fiber Count Cable Designs, Eric R. Logan, et al—Int'l. Wire & Cable Symposium Proceedings 1999.

* cited by examiner

HIGH FIBER COUNT OPTICAL FIBER CABLE WITH BUFFER TUBES AROUND CENTRAL STRENGTH MEMBER

FIELD OF THE INVENTION

The invention relates to optical fiber communication cables comprising buffer tubes which loosely receive optical fiber ribbons and which are disposed around a central strength member and particularly, to such a cable with a high optical fiber count and with a relatively small diameter.

BACKGROUND OF THE INVENTION

There are various types of optical fiber cables including what are sometimes called a single tube cable, a loose tube cable and a slotted core cable. In a single tube cable a tube of plastic or other material has its axis coaxial with the cable axis and loosely receives individual optical fibers or optical fibers in side-by-side relation in one or more ribbons. Usually externally of the tube, such as in a cable jacket which encircles the tube, there are strength members used to resist tensile and compressive forces applied to the cable.

In a so-called loose tube cable, there is a central strength member for resisting such forces and a plurality of plastic tubes, known as buffer tubes, are wound around the strength member, either helically or in reverse oscillating or S-Z lay.

The buffer tubes loosely receive individual optical fibers or optical fibers in side-by-side relation in one or more ribbons. The buffer tubes are encircled by one or more jacketing layers which may or may not include, encircle, or underlie strength members.

A slotted core cable usually has a core comprising a central strength member embedded in a plastic body with circumferentially spaced, outwardly opening, longitudinal slots which loosely receive individual optical fibers or optical fiber ribbons. The core with the optical fibers is encircled by a jacket.

There is a need for optical fiber cables containing a large number of optical fibers, i.e. having a high fiber count (HFC). There are many factors to be considered in the design of high fiber count optical fiber cables. See, for example, the article entitled "The Status and Future of High Fiber Count Cable Designs" by Logan et al and published in the International Wire & Cable Proceedings 1999. Thus, cable size, weight, stiffness, environmental and mechanical performance, cable bend radius, storage reel size, length of cable per reel and packing density are all factors to be taken into consideration.

Other factors include the ease of access to the fibers intermediate the cable ends. Ideally, such access should disturb the minimum number of fibers not being accessed. Additionally, the ease of identification of optical fiber ribbons, the optical fibers and the locations of the ribbons and fibers in the cable are important.

Cables of the three described types with substantially the same number of optical fibers have different characteristics in certain respects. For example, a loose tube cable can have a smaller minimum bend radius and better environmental performance and a greater length of the cable can be received on a standard reel than most of the other cable types. Also, a loose tube cable can have a better flexibility than either of the other two cable types and can be easier for craftsmen to use, to identify ribbons or fibers and to install, connect and/or test ("craft-friendly") than the other two cable types.

Another factor of importance is the cross-sectional size of the cables because they are often installed in ducts, and it is desirable to keep the duct size to a minimum and to avoid replacing existing ducts. Ducts are identified by bore diameter, e.g. 1.25 inch (31.7 mm), 1.5 inch (38.1 mm) and 2.0 inch (50.8 mm). Ducts of a 2 inch size are not as common as the other sizes, and the greatest demand is for cables which can be easily installed in 1.25 inch and 1.5 inch ducts. However, cables which can be easily installed in a 2 inch duct are desirable for some purposes.

A cable must have dimensions such that it can be pulled into and through a duct without damage because of the installation forces applied thereto. Those skilled in the art use a so-called "fill factor" as a measure of the acceptability of a cable to be installed in a duct. "Fill factor" is sometimes defined as the ratio of the cross-sectional area of the cable to the cross-sectional area of the bore of the duct and in the case of a cable and a bore of circular cross-sections, is sometimes defined as the ratio of the cable diameter to the bore diameter. The latter definition will be used herein and in the claims.

From experience, those skilled in the art are aware that the lower the fill factor of a given type of cable, the easier it is to thread or feed a cable through a duct. Generally, the arbitrary, acceptable fill factor is considered to be in the range from 80–85% depending on the cable characteristics, i.e., cross-sectional shape, surface coefficient of friction and cable flexibility. With the usual circular cross-section cable, the plastic of the jacket can be selected to provide a relatively low coefficient of friction with the duct material.

However, cable flexibility depends on the location of the strength member or members with respect to the cable axis and other factors. Thus, a cable with the strength member at the cable axis is more flexible than a cable with one or more longitudinal strength members spaced from the cable axis as is the case with a single tube cable. The flexibility of a slotted core cable is reduced as compared to a central strength member alone, by the thickness of the plastic around the central strength member required to provide the slots which receive the optical fibers. As mentioned hereinbefore, for a given cable size, the loose tube cable with a central strength member around which buffer tubes are wound has better flexibility than the single tube and slotted core cables.

On the other hand, the flexibility of a loose tube cable decreases with the number of buffer tubes included in the cable, and therefore, the prior art practice of increasing the number of buffer tubes, e.g., to six tubes, to increase the optical fiber count not only increases the cable diameter and hence, the fill factor, but also reduces the cable flexibility. Also, an increase in the number of buffer tubes increases the cost of manufacturing a cable. However, if the normal, substantially circular cable cross-section is desired, the loose tube cable should have more than three buffer tubes.

In addition, certain practices have been adopted in the art as an approach to standardization for ease of installation, splicing, testing, connector types, etc., particularly in North America. For example, it is customary that when optical fiber ribbons are used, each ribbon contains twelve optical fibers, or integral multiples of twelve, optical fibers. Also, as the number of optical fibers in a cable is increased, it is conventional to increase the number of optical fiber ribbons by multiples of twelve. For example, a cable can have: 36 twelve fiber ribbons (432 fibers), 72 twelve fiber ribbons (864 fibers), 144 twelve fiber ribbons (1728 fibers), 108 twenty-four fiber ribbons (2592 fibers), etc.

Because of its desirable characteristics, a loose tube cable with ribbons providing a fiber count greater than 1000 which will not cause a need to depart from prior practices, which is craft friendly and which is easily installed in a 1.5 inch duct is highly desired by the industry.

Similarly, a loose tube cable with ribbons providing a fiber count greater than 2000 which will not cause a need to depart from prior practices, which is craft friendly and which is easily installed in a 2 inch duct is desired by the industry.

The increase in fiber count of such a loose tube cable with optical fiber ribbons cannot be obtained by merely increasing the number of ribbons in a loose tube cable having the required size. Thus, the optical fiber ribbons used to meet the present practices have a standard size and have their own requirements such that the fibers and the ribbons cannot be significantly reduced in size. The buffer tubes containing the ribbons must have a certain relationship between the tube bore and the ribbon stack to prevent damage to the fibers, i.e., the bore size must be such that the ribbons are loosely received in the buffer tubes, and the wall thickness of the tubes cannot be significantly reduced. Similarly, the jacket thickness must not only be sufficient to provide protection to the buffer tube, and hence, the fibers, but also be supported from within to maintain a proper jacket shape.

SUMMARY OF THE INVENTION

After substantial study of the problem of providing a loose tube cable with optical fibers in ribbons and a high fiber count, e.g. greater than 1000, which can be received in a 1.5 inch duct with about an 80%–85% fill factor and which will not require changes in the practices adopted by the industry, we have discovered that such a cable can be made with 1728 fibers and, in addition, it is possible to increase the total number of fibers by another 144 fibers to 1872 fibers, which are not in ribbons, if such additional fibers are desired. Thus, as compared to commercially available loose tube cables with optical fiber ribbons which are compatible with a 1.5 inch duct, the number of optical fibers in the cable is substantially increased.

We have also discovered that if the cable of the invention is to be compatible with a larger duct, i.e., a 2 inch duct, a substantial increase in optical fibers, as compared to commercially available loose tube cables, also can be obtained.

In the cable of the invention, optical fiber ribbons of the conventional size, buffer tubes of conventional wall thickness and ratio of bore size to ribbon stack size and a conventional jacket are used, but four buffer tubes, rather than the conventional six buffer tubes, are used for a cable compatible with a 1.5 inch duct. For a cable compatible with a 2 inch duct, the cable of the invention can have four or five buffer tubes, and it is possible to increase the total number of optical fibers by using ribbon stacks with ribbons containing different numbers of optical fibers. The buffer tubes are disposed, each in contact with adjacent tubes, around and in contact with a central strength member structure which, as a result of using four or five buffer tubes, can be reduced in diameter as compared to cables with a greater number of tubes, to provide increased space available for other elements, such as, optical fiber ribbons.

As compared to other cables compatible with a two inch duct, the cable of the invention has a lower fill factor and/or a higher fiber count.

DETAILED DESCRIPTION OF PREFERRED EMBODIMENTS

Figure 1:
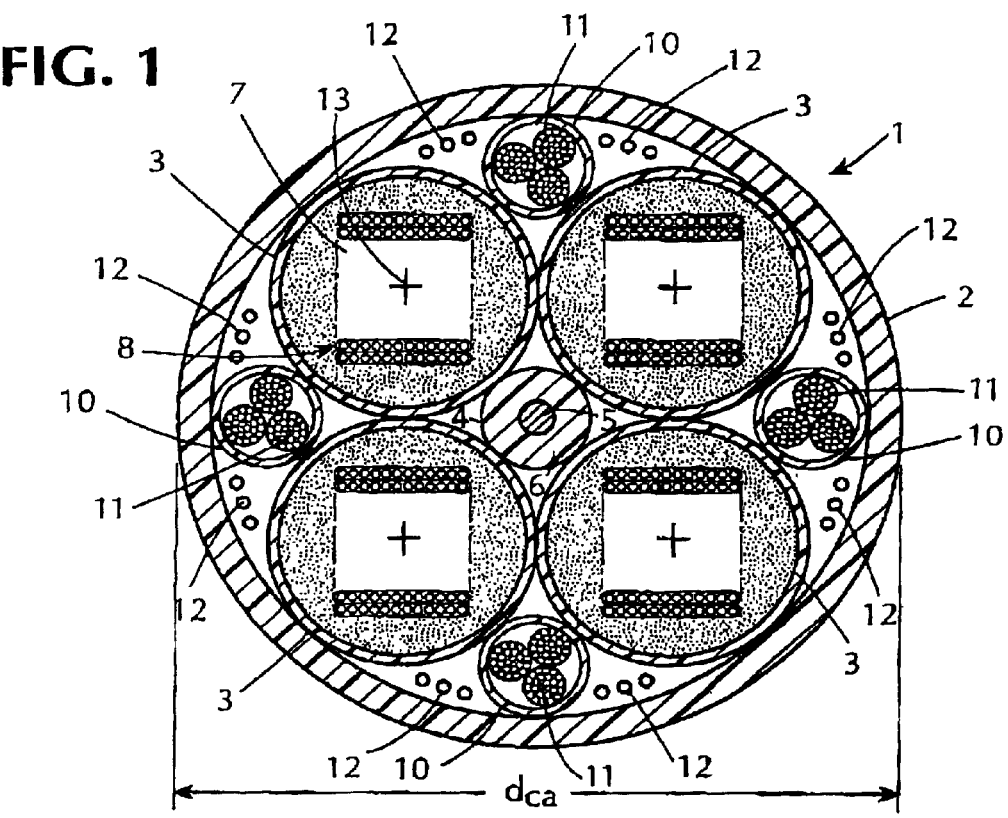
FIG. 1 is a transverse cross-section of a cable of the invention with four buffer tubes loosely containing optical fiber ribbons and with interstitial optical fibers and strength members.

A four buffer tube embodiment of the optical fiber cable of the invention is illustrated in FIG. 1, but before describing the cable 1 illustrated in FIG. 1, the difficulties in designing an optical fiber cable which can be fed in a 1.5 inch (38.1 mm) duct and which has substantially in excess of 1000 optical fibers must be considered. Reference to the schematic diagram of FIGS. 2–4 will be made for this purpose.

The space within the cable jacket 2 is most efficiently used for containing optical fibers when the buffer tubes 3 contact each other and extend from the outer surface of the central strength member to the inner surface of the jacket 2. Also, contact of the buffer tubes 3 with the outer surface of the central strength member 4, 4a, 4b around which the buffer tubes 3 are wound simplifies the manufacturing process. The core 5 of the strength member, which is preferably a steel wire or a bare e-glass and which supplies most of the resistance to tension and compression forces on the cable, must, have a minimum diameter for the expected forces, e.g. about 3 mm.

Figure 2:
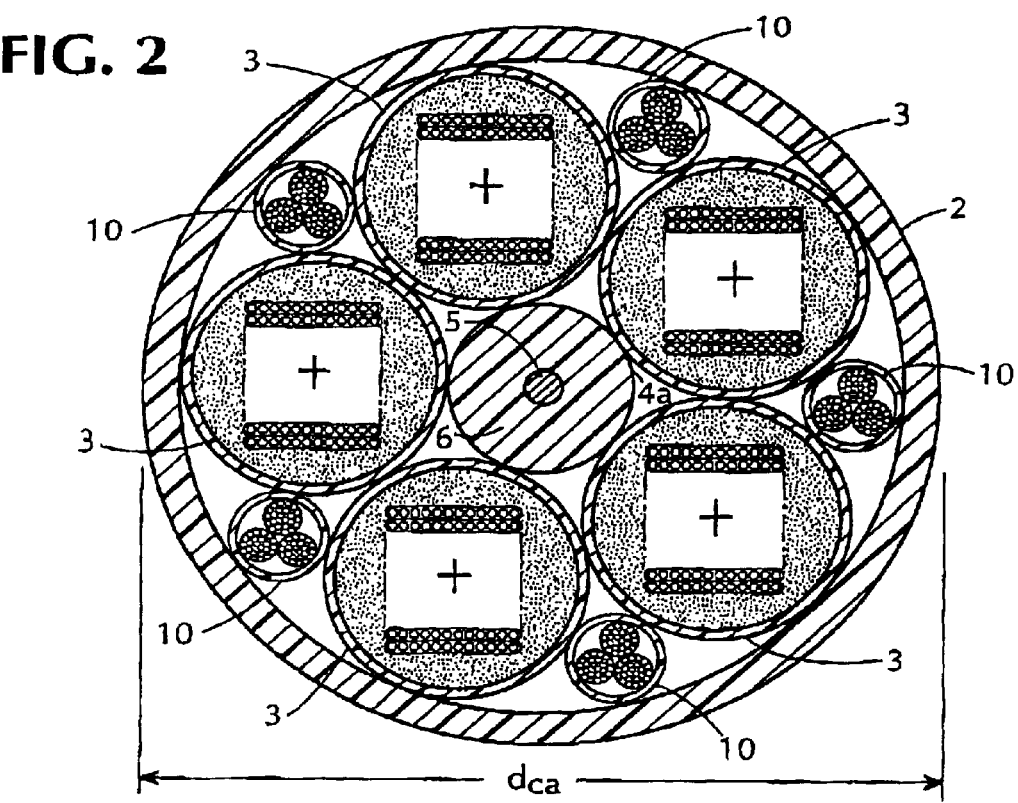
FIG. 2 is similar to FIG. 1 but with five buffer tubes and with interstitial strength members omitted.
Figure 3:
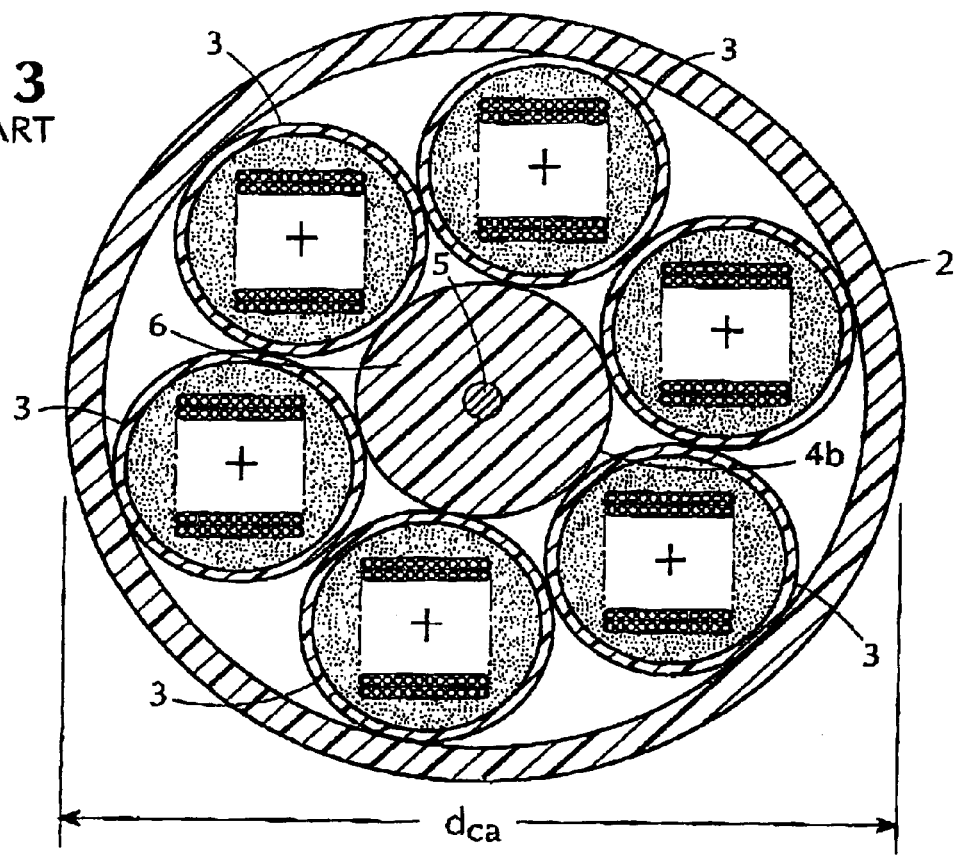
FIG. 3 is a schematic, transverse cross-section of a six buffer tube cable around a central strength member structure and with optical fibers, etc., omitted, which is used for purposes of illustration.

As is apparent from examination of FIGS. 1–3, when the buffer tubes 3 are of the same outer diameter and each buffer tube 3 contacts adjacent tubes 3, an increase in the number of buffer tubes 3 determines an increase of the space bound by the buffer tubes 3 and for the buffer tubes 3 to contact the strength member 4, the diameter of the strength member 4 must be increased also. Thus, the radius of the strength member 4 approximately doubles when the number of buffer tubes increases from to four to five and approximately triples when the number of buffer tubes increases from four to six. Correspondingly, the area occupied by the strength member increases by the square of the increase in radius (area=$\pi r^2$). Of course, a strength member 4 of circular cross-section does not fill all the space enclosed by the buffer tubes 3, and therefore, the space bounded by the buffer tubes 3 and not available for optical fibers in buffer tubes 3, is even larger then the cross-section of the strength member 4.

The core 5 of the strength member 4 can have a diameter less than the space enclosed by the buffer tubes 3 and still provide the necessary strength when there are four buffer tubes 3. As the number of buffer tubes 3 is decreased from four to three, there is a corresponding decrease in the space for the strength member 4, and the space can be too small for an adequate core 5, which usually has a diameter of at least 3 mm. Furthermore, the triangular outer shape of three buffer tubes 3 would make a cable with buffer tubes 3 more susceptible to side wall pressure effects. Therefore, the minimum number of buffer tubes 3 to be considered is four.

In conventional practice, the strength member 4 comprises, around core 5, at least one layer of plastic 6, but may have other layers, and when the core 5 is smaller in diameter than the space bounded by the buffer tubes 3, the core is "up-jacketed", i.e. the radial thickness of the layer or layers encircling the core 5 is such that the abutting buffer tubes 3 contact the outer surface of the strength member 4. However, such up-jacketing increases the cost of material for a cable, and in addition, can undesirably increase the stiffness of the cable. For these reasons, it is desirable to keep the radius of the layer 6 encircling the core 5 to a minimum.

Conventional optical fiber ribbons have a predetermined thickness and width. Thus, ribbons with twelve optical fibers have a thickness of substantially 0.34 mm and a width of about 3.3 mm. Ribbons with twenty four optical fibers have substantially the same thickness and substantial double the width. For example, a stack of twelve, twenty-four fiber ribbons would be approximately 6.6 mm wide and 4 mm high i.e. thick, and a stack of eighteen, twenty four fiber ribbons would be approximately 6.6 mm wide and 6.1 mm high. To maximize the use of the bore of a buffer tube, the height and width of the stack should be as nearly equal as possible.

In order to be received loosely in a buffer tube, the diameter of the bore of the buffer tube must exceed the maximum cross-sectional dimension of a ribbon stack. Preferably, the rectilinear length of the stack axis 13 (see FIG. 5) is greater than the rectilinear length of the buffer tube axis, and therefore, the buffer tube bore diameter exceeds the maximum cross-sectional dimension of the stack by a predetermined amount to permit the stack to bend slightly in the direction transverse to the tube axis. Preferably, each of the stacks 8 is helically twisted around its axis 13.

Usually, a buffer tube 3 has a wall thickness of approximately 0.8–1.0 mm, and the jacket can have a wall thickness of approximately 1.2 to 1.4 mm.

Figure 4:
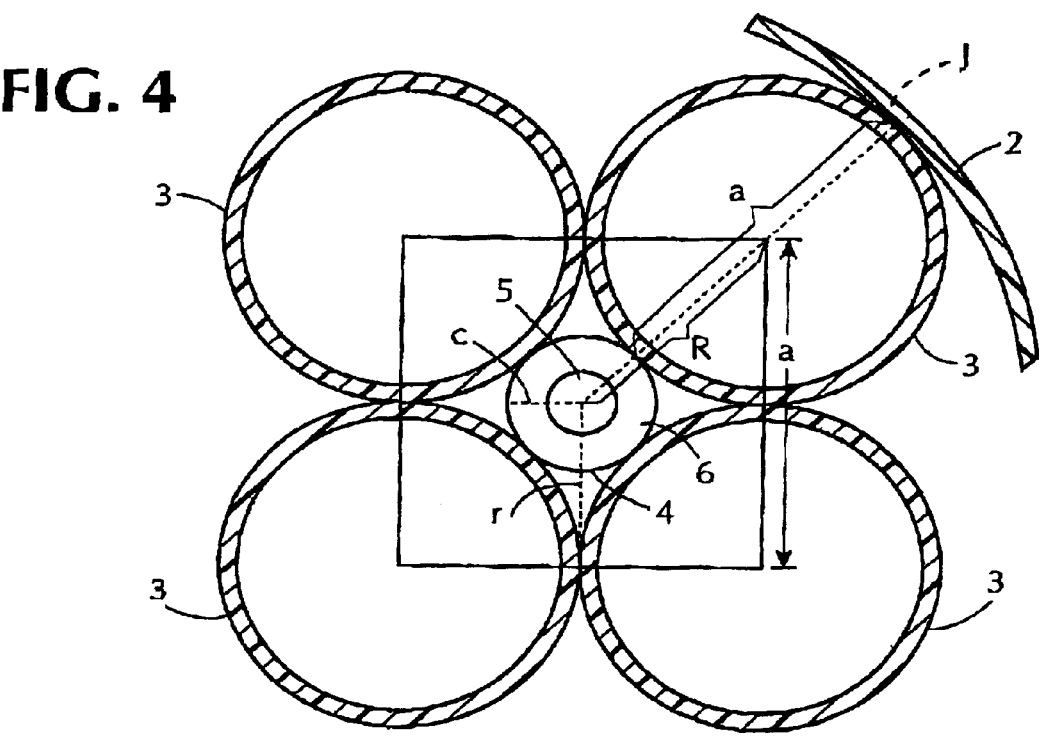
FIG. 4 is a schematic diagram used to illustrate the method of designing cables of the invention.

From FIG. 4, it will be observed that the diameter of a loose tube optical fiber cable can be expressed by the formula:

$$d_{cable}=2(c+a+j)$$

where c is the radius of the central strength member 4, a is the outside diameter of a buffer tube 3 and j is the wall thickness of a jacket 2. Such formula omits the radial thickness of any other layers, such as water absorbing layers, metal sheaths, etc., which may be included in the cable and represents the minimum diameter of such a cable.

From the foregoing, it is apparent that the jacket thickness and the buffer tube wall thickness have substantially constant values regardless of the number of buffer tubes 3. Therefore, the variables are the radius of the central strength member 4 which varies with the number and diameters of the buffer tubes 3, the diameters of the buffer tubes varying with the number of optical fiber ribbons 7 (see FIG. 1) contained in the buffer tube 3.

The problem becomes one of providing a loose tube cable with optical fiber ribbons, which cable will slidably fit in a 1.5 in. (38.1 mm) duct or have a fill factor less than 80% in a 2 in. (50.8 mm) duct but which includes more than 1000 optical fibers. Conventional loose tube cables which have a fill factor of 80% in a 1.25 in. duct and a 60% fill factor in a 2 in. duct have six buffer tubes and only 864 fibers in ribbons. A slotted core cable with the same fill factor has only 1000 fibers in ribbons.

We have discovered that by using only four buffer tubes 3 of the proper outside diameter and optical fiber ribbons 7, a loose tube cable can be made which contains at least 1728 optical fibers and which has about an 84% fill factor for a 1.5 in. duct and about an 80% fill factor for a 2 in. duct. Such a high fiber count cable with fill factor lower than 85% for a 1.5 in. duct cannot be made with a greater number of buffer tubes 3. The invention is also applicable to the manufacture of optical fiber cables with a lesser number of optical fibers but in excess of 1000 optical fibers.

Because the use of four buffer tubes 3, there are spaces bounded by pairs of buffer tubes 3 and the jacket 2 of sufficient size to accommodate additional, smaller buffer tubes which can contain additional optical fibers so that the total fiber count can be at least 1728 optical fibers and possibly as high as 1872 optical fibers.

The diameter of a loose tube optical fiber cable with any number of buffer tubes 3 with buffer tubes of different sizes, and hence, the number of optical fibers in a buffer tube, can be obtained with the aid of FIG. 4 which illustrates schematically a four buffer tube cable. A similar procedure can be used with a different number of buffer tubes.

For example, let it be assumed that the cable is to have four buffer tubes 3 disposed as shown in FIG. 4, i.e. each tube 3 abuts adjacent tubes 3, the tubes 3 are encircled by a jacket 2 having a thickness of 1.5 mm. Also, let it be assumed that each buffer tube loosely contains 18 stacked optical fiber ribbons, each ribbon including 24 optical fibers. In such case, each buffer tube outer diameter would be about 12.2 mm, if the buffer tube has a wall thickness of 0.8–1.0 mm, to provide the desired looseness of the stack in the tube bore.

The drawing of FIG. 4 is then made with buffer tubes 3 having an outer diameter of 12.2 mm (dimension "a"), which is the same dimension of each side of a polygon interconnecting the centers of the tubes 3. A circle having the radius R is found by the equation R=½ a(csc 180°/K) where K is the number of tubes. A circle having the radius r is found by the equation r=½a (cot 180°/K).

A circle having the radius c and representing the strength member 4 is found by the equation c=R−½a.

Thus, for the four buffer tube cables used for an example, the approximate values, in millimeters are as follows:

| No. of Tubes | Radius R | Radius r | Radius c |
|---|---|---|---|
| 4 | 8.63 | 6.10 | 2.53 |

The cable of the example will have approximately the following characteristics:

| No. of Fibers | Cable Radius | Cable Diam. | Cable Area | Packing Density |
|---|---|---|---|---|
| 1728 | 15.9 mm | 31.8 mm | 794.22 sq. mm | 2.1 fibers/mm² |

The fill factor for the cable of the example in a 1.5 in. duct is 85% (32.45/38.1) and in a 2 in. duct is 64% (32.45/50.8).

By a similar analysis, the buffer tube 3 outside diameter and the number of optical fiber ribbons per buffer tube 3 can be determined for desired fill factors. For example, if the fill factor is to be 80% in a 1.5 in. duct, then the cable diameter would be approximately 30.5 mm (38.1×0.8). With such cable diameter, the outside diameter of the four buffer tubes 3 would be 11.4 mm, and the number of optical fiber ribbons in a tube is 15, each ribbon with 24 fibers, can result in 360 fibers per tube and a total of 1440 fibers in a cable.

FIG. 1 illustrates a preferred embodiment of the cable of the invention and corresponds to the four buffer tube cable for which details were given hereinbefore. Thus, the cable 1 includes four buffer tubes 3, each tube 3 encircling a stack 8 of 18 flexible optical fiber ribbons 7, each of which has 24 optical fibers in side-by-side spaced relation and encased in a plastic. The total number of optical fibers in tubes 3 is 1728 (4×432). Each tube 3 abuts a pair of adjacent tubes 3 and contacts a central strength member 4. The tubes 3 can be helically wound around the central strength member 4, but preferably, the tubes have an S-Z or oscillating lay so that optical fibers on the tubes 3 can be readily accessed.

The tubes 3 are made of plastic, e.g. polybutylene, polyethylene or similar plastics, preferably, high density polyethylene, and although such can be omitted, otherwise empty spaces in the tubes 3 can be filled with a water blocking material, such as a gel or grease known in the art. Alternatively, the otherwise empty spaces can have therein a water blocking/absorbing material of a known type, such as in the form of threads, when a dry cable is desired.

The wall thickness of the tubes 3 can be on the order of 0.9±0.1 mm, and the outer diameter of the tubes 3 can be 12.2 mm.

The central strength member 4 can be bare stranded steel wire or bare e-glass approximately 5.1 mm in diameter or the central strength member 4 can have a core 5 of such material encircled by a layer 6 of plastic, such as polyethylene, polyvinylchloride, polyurethane, and preferably, medium density polyethylene. Preferably, the strength member would be made entirely of e-glass with no up-jacket 6. Instead of only a single material, the layer 6 can comprise a layer of plastic wrapped with water blocking tape or threads or the layer 6 can be only water blocking tape or threads wrapped around and in contact with the core 5.

If desired, and preferably, the tubes 3 are wrapped with a known type of water blocking/absorbing tape 9 (see FIG. 5) which can have a width on the order of four inches.

The assembly of the tubes 3 and the central strength member 4, with or without the water blocking tape around the tubes 3, is encircled by a plastic jacket 2 which can be made of polyethylene or other plastics commonly used for such purpose. The wall thickness of the jacket 2 can be on the order of 1.2 to 1.4 mm although the thickness can vary depending upon where the cable is to be used. If the desired cable diameter will permit, the jacket 2 of plastic can encircle, incorporate or be encircled by a thin metal sheath to improve the ability of the cable to resist external forces and rodents.

From an examination of FIG. 1, it will be observed that there are four spaces bounded by the buffer tubes 3 and the jacket 2. While these spaces can be left empty, it is preferred that the spaces be at least partially filled to help maintain a circular cross-section for the jacket 2. The spaces can be at least partially filled with a dry water blocking/absorbing material, e.g. in the form of a rope, and if used, the wrapping of tape 9 around the buffer tubes can be retained or omitted. However, with four buffer tubes 3, the spaces are large enough to receive four additional, but smaller, plastic buffer tubes 10 containing a plurality of optical fibers 11, either as individual fibers or bundles of fibers. For example, each of the tubes 10 can have a bore large enough to receive 12 loose, separate fibers or, in some cases, three bundles of 12 fibers each. Thus, with loose, separate fibers, the optical fiber count of the cable can be increased to 1776 fibers, and with optical fiber bundles, to 1872 fibers.

The ability to have the additional optical fibers 11 is advantageous in at least two respects. First of all, in addition to providing a higher fiber count, the optical fibers 11 can be used as spares when the full fiber count is not needed, i.e. if only 1728 fibers are needed, one or more of the fibers 11 can be used in the event one or more of the fibers in the ribbons 7 becomes defective or broken.

Secondly, it often is necessary to "tap" into a cable intermediate its ends to provide service at an intermediate point along the length of the cable. While some service providers want access to only 12 optical fibers for such purpose, other service providers want access to a fewer number, e.g. two or four, optical fibers. The optical fibers 11 are readily accessible, particularly when they are stranded with an S-Z or oscillating lay, and can be used for such purpose without disturbing the buffer tubes 3.

Thirdly, these "spare" fibers may provide a ready means of continually monitoring cable performance without affecting revenue-producing fibers or interrupting traffic.

Optionally, the cable 1 can also include further strength members 12 in the spaces bounded by the buffer tubes 3 and the jacket 2. The strength members 12 can be, for example, aramid yarns, water swellable glass yarns, etc.

Figure 5:
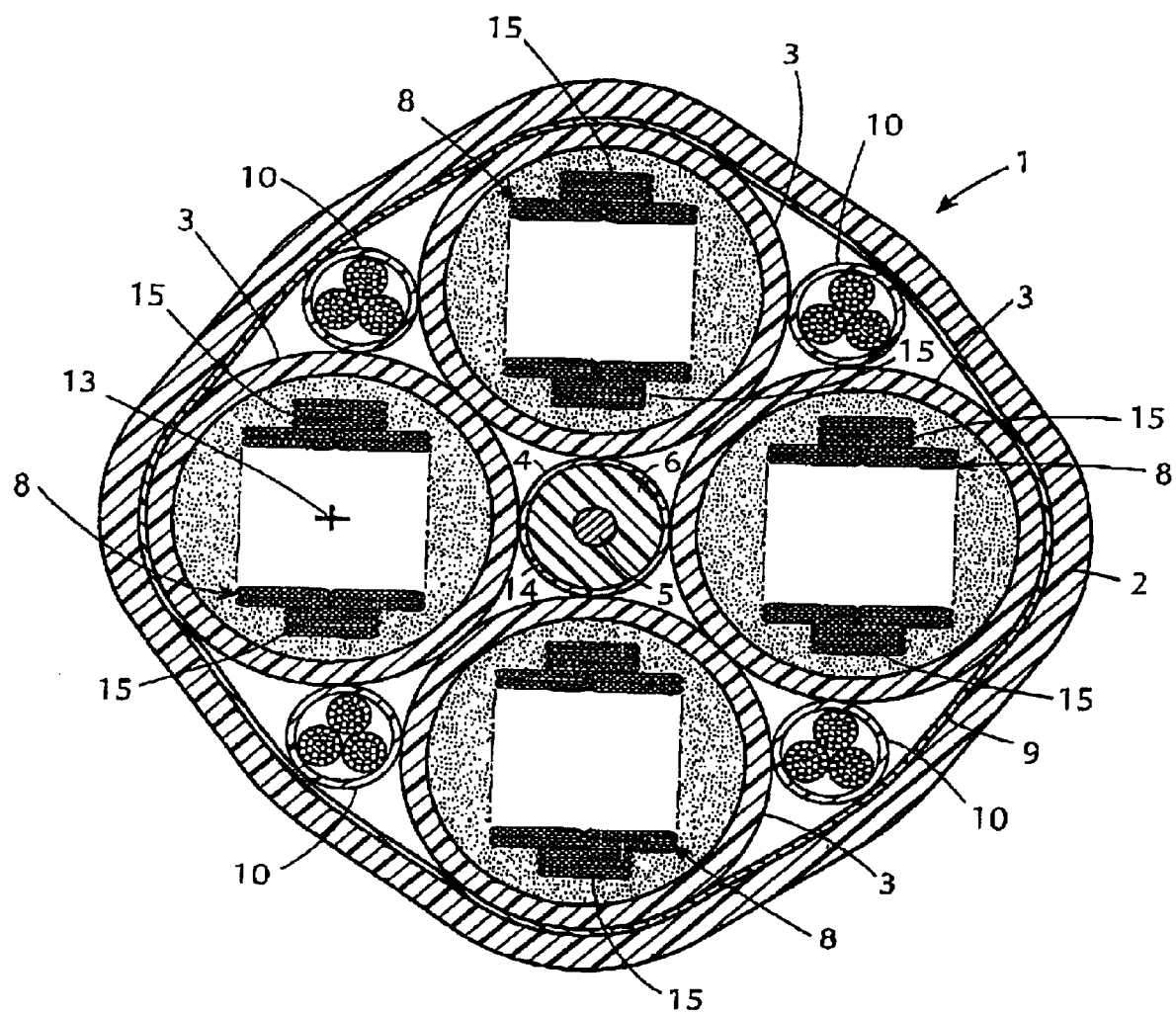
FIG. 5 illustrates a four buffer tube cable of the invention with optical fiber ribbons of different optical fiber count.

FIG. 5 illustrates a preferred embodiment of a four buffer tube cable of the invention which is similar to the embodiment shown in FIG. 1, but omits optional flexible strength members 12. However, such strength members can be used in the embodiment shown in FIG. 5. Although they can be omitted if a lower fiber count is acceptable, FIG. 5 shows three-twelve fiber ribbons 15 at opposite ends of each stack of ribbons 8. Such ribbons 15 can be lesser in number, but three such ribbons 15 can be added at each of the ends of the stacks 8 without significantly restricting movement of the ribbons in the buffer tubes 3.

As previously mentioned, the cable 1 shown in FIG. 5 has a water blocking tape 14 encircling the strength member 4 and a water blocking tape 9 encircling the buffer tubes 3. Such tapes 9 and 14 are well-known in the art and are provided to assist in preventing damage to the optical fibers by moisture. In some cases, one of the tapes, 9 or 14, can be omitted. Because such tapes 9 and 14 are very thin, the thickness being on the order of 1 mil, the presence of the tapes does not affect the optical fiber count for a cable 1 of a given external diameter.

Representative dimensions for the embodiment shown in FIG. 5 are as follows:

| Component | O. Dia | Wall Thickness | Inside Dia |
| --- | --- | --- | --- |
| Central strength member 4 | 5.0 mm | Not app. | Not app. |
| Buffer tubes 3 | 12.1 mm | 0.9 mm | 10.3 mm |
| Interstitial tubes 10 | 4.1 mm | 0.5 mm | 3.1 mm |
| Ave. cable diameter | 31.8 mm | Not app. | Not app. |

The height of the stack 8 plus the six-twelve fiber ribbons is approximately 8.4 mm and the width of the stack 8 is approximately 6.6 mm. There are 18 twenty-four fiber ribbons in each tube 3 making the total fiber count in the tubes 3a a total of 1728+288 or 2016 optical fibers. Each of the four interstitial tubes 10 can include 36 optical fibers so that the total fiber count of the cable can be 2160 optical fibers.

The characteristics of the cable of the invention with four buffer tubes 3 and which will have a fill factor not greater than 85% in a 1½ inch duct, and the characteristics of prior art cables with a similar fill factor are set forth in the following Table I. The buffer tubes 3 of the cable of the invention are stranded, and in all cables, the optical fibers are loosely received in the tubes or slots. Each of the cables of the invention has, in each buffer tube 3, a stack 8 of 18-twenty four fiber ribbons and optionally six-twelve fiber ribbons 15 and/or four-36 fiber bundles in tubes 10.

TABLE I

| | Cable of the Invention | | | | Prior Art | | | | | |
|---|---|---|---|---|---|---|---|---|---|---|
| | 24 fiber ribbons, 4 position stranded | 24 fiber ribbons + interstitial fibers | 24 fiber ribbons + extra ribbons | extra ribbons + interstitial fibers | single tube, 24 fiber ribbons | single tube, 36 fiber ribbons | 6 position, stranded tube | 6 position, stranded tube | 5, slot, slotted core | 13 slot, slotted core |
| fiber count | 1728 | 1872 | 2016 | 2160 | 864 | 1296 | 432 | 864 | 400 | 1000 |
| cable diameter (estimated mm) | 32 | 32 | 32 | 32 | 25 | 30 | 24 | 26.5 | 21 | 28 |
| est. cable bend radius (mm) | 320–640 | 320–640 | 320–640 | 320–640 | 250–500 | 300–600 | 240–480 | 270–540 | 210–420 | 280–560 |
| percentage duct fill (1.5 inch duct) | 84% | 84% | 84% | 84% | 66% | 79% | 63% | 70% | 55% | 73% |
| maximum cable length, (meters, on 96 inch reel* | 4000 | 4000 | 4000 | 4000 | 7000 | 5200 | 8000 | 5600 | 9900 | 5200 |
| fiber packing density** | 2.1 | 2.3 | 2.5 | 2.7 | 1.8 | 1.8 | 1.0 | 1.6 | 1.2 | 1.6 |

*approximate - depends on reel construction
**fibers/square mm

From Table I, it will be observed that with the cables of the invention which have a fill factor of not greater than 85% for a 1½ inch duct and which have four buffer tubes 3, the fiber count and the fiber packing density are much higher than the fiber counts and fiber packing densities of the prior art cables. However, if the cable is to have a fill factor not greater than 85% for a two inch duct, the principles of the invention permit the construction of a cable with five buffer tubes 3 (see FIG. 2) and with a high fiber count. Also, a cable with four buffer tubes 3 designed for a 2-inch duct can have a higher fiber count than the four buffer tube cables described hereinbefore, still having a fill factor not greater than 85%, but a six buffer tube constructed in accordance with the principles of the invention would have a fill factor greater than 85% in a two inch duct.

The characteristics of the cables of the invention with four or five buffer tubes 3 and which will have a fill factor not greater than 85% in a two inch duct, and the characteristics of prior art cables with a similar fill factor are set forth in the following Table II. The buffer tubes of the cables of the invention are stranded, and in all cables, the optical fibers are loosely received in the tubes or slots. Each of the cables of the invention has a stack 8 of 24 fiber ribbons, and the stack 8 of the five tube cable has 18 ribbons. The stack 8 of the four tube cable has 25 ribbons. Optionally, the five tube cable can have up to six 12 fiber ribbons, as in FIG. 5, and/or five interstitial tubes 10 each with 36 optical fibers, as in FIG. 2.

TABLE II

| | Cable of the Invention | | | | Prior Art | | |
|---|---|---|---|---|---|---|---|
| | 5 tube, 24 fiber ribbon | 5 tube, 24 fiber ribbon + extra ribbons | 5 tube, extra ribbons + interstitial fibers | 4 tube, 25 ribbons of 24 fibers each | single tube, 36 fiber ribbons | 25 slot, slotted core | 20 slot, slotted core |
| fiber count | 2160 | 2520 | 2700 | 2400 | 1296 | 2000 | 3200 |
| cable diameter (estimated mm) | 36 | 36 | 36 | 40.4 | 30 | 38 | 43 |
| est. cable bend radius (mm) | 360–720 | 360–720 | 360–720 | 400–800 | 300–600 | 380–760 | 430–860 |
| percentage duct fill 2 inch duct) | 71% | 71% | 71% | 80% | 59% | 75% | 85% |
| maximum cable length, (meters, on 96 inch reel* | 2600 | 2600 | 2600 | 1800 | 5200 | 2100 | 1500 |
| fiber packing density** | 2.1 | 2.5 | 2.7 | 1.9 | 1.8 | 1.8 | 2.2 |

*approximate - depends on reel construction
**fibers/square mm

From Table II, it will be observed that all the cables, both four tube and five tube, has a fill factor of 80% or less, and a significant increase in fiber count and fiber packing density as compared to the prior art single tube and 25 slot, slotted core cables. Although the cables of the invention do not have as high a fiber count and fiber packing density as the 20 slot, slotted core cable, the cables of the invention have a better fill factor and more of the cable of the invention can be stored on a 96 inch reel. Also, the minimum bend radius of the cables of the invention can be less than the minimum bend radius of the 20 slot, slotted core radius.

Although preferred embodiments of the present invention have been described and illustrated, it will be apparent to those skilled in the art that various modifications may be made without departing from the principles of the invention.

What is claimed is:

1. An elongated optical fiber cable with a longitudinal axis and with more than 1000 optical fibers, said cable having a fill factor not greater than about 85% in a two inch duct and said cable comprising:
   a central strength member structure coaxial with the longitudinal axis;
   a plurality of longitudinally extending buffer tubes disposed around the central strength member structure in a single layer with each tube in contact with a pair of adjacent tubes and in contact with the strength member structure, the number of buffer tubes being greater than three and less than six and each tube having a bore of a predetermined size;
   a plurality of optical fiber ribbons in a stack in the bore of each of said tubes each stack substantially filling, but being loosely received, in the bore of the tube in which the stuck is received and each ribbon comprising a plurality of optical fibers in side-by-side relation and wherein the total number of optical fibers in the plurality of buffer tubes is greater than 1000; and
   a jacket encircling the plurality of buffer tubes, wherein the jacket has a thickness and the buffer tubes and the central strength member structure have respective outer diameters selected such that the sum of one-half the diameter of the central strength member structure, the outer diameters of the buffer tubes and the jacket thickness results in the cable having a fill factor not greater than about 85% in a two inch duct.

2. An optical fiber cable as set forth in claim 1 wherein the number of buffer tubes is four, the total number of optical fibers is greater than 2000 and the fill factor is not greater than about 80% in a two inch duct.

3. An optical fiber cable as set forth in claim 2 wherein each of the optical fiber ribbons in a stack received in at least one buffer tube contains the same number of optical fibers.

4. An optical fiber cable as set forth in claim 3 wherein each of the ribbons in a stack received in at least one buffer tube contains twenty-four optical fibers.

5. An optical fiber cable as set forth in claim 2 wherein some the optical fiber ribbons in a stack received in at least one buffer tube contain fewer optical fibers than other optical fiber ribbons in the same stack.

6. An optical fiber cable as set forth in claim 5 wherein some of the optical fiber ribbons contain twelve optical fibers and some of the optical fiber ribbons contain twenty-four optical fibers.

7. An optical fiber cable as set forth in claim 1 wherein the fill factor is not greater than about 75%.

8. An optical fiber cable as set forth in claim 1 wherein the number of buffer tubes is four, the total number of optical fibers is greater than 1500 and the fill factor is not greater than about 85% in a one-and one-half inch duct.

9. An optical fiber cable as set forth in claim 8 wherein there are interstices within the jacket which are intermediate pairs of buffer tubes and also intermediate such pairs of buffer tubes and the jacket and wherein there are additional optical fibers in at least one of the interstices.

10. An optical fiber cable as set forth in claim 9 wherein the total number of optical fibers is at least 1700.

11. An optical fiber cable as set forth in claim 1 wherein the number of buffer tubes is five, the total number of optical fibers is greater than 2000 and the fill factor is not greater than about 80% in a two inch duct.

12. An optical fiber cable as set forth in claim 11 wherein each of the optical fiber ribbons in a stack received in at least one buffer tube contains the same number of optical fibers.

13. An optical fiber cable as set forth in claim 12 wherein each of the ribbons in a stack received in at least one buffer tube contains twenty-four optical fibers.

14. An optical fiber cable as set forth in claim 11 wherein some of the optical fiber ribbons in a stack received in at least one buffer tube contain fewer optical fibers than other optical fiber ribbons in the same stack.

15. An optical fiber cable as set forth in claim 14 wherein some of the optical fiber ribbons contain twelve optical fibers and some of the optical fiber ribbons contain twenty-four optical fibers.

16. An optical fiber cable as set forth in claim 1 wherein the number of buffer tubes is five, the total number of optical fibers is greater than 2600 and the fill factor is not greater than about 80% in a two inch duct.

17. An optical fiber cable as set forth in claim 1 wherein the central strength member structure comprises a core of high tensile strength material and an encircling layer of jacketing material.

18. An optical fiber cable as set forth in claim 1 wherein the central strength member structure comprises a core of high tensile strength material and an encircling layer of water blocking material.

19. An optical fiber cable as set forth in claim 1 wherein the central strength member structure comprises e-glass without an up-jacket.

20. An optical fiber cable as set forth in claim 1 further comprising water blocking material within the jacket.

21. An optical fiber cable as set forth in claim 1 further comprising flexible strength members within the jacket and spaced from the central strength member structure.

22. An optical fiber cable as set forth in claim 1 wherein the buffer tubes are disposed around the central strength member structure in reverse alternating lay.

23. An elongated optical fiber cable with a longitudinal axis and with more than 1000 optical fibers, said cable having a fill factor not greater than about 85% in a two inch duct and said cable comprising:
   a central strength member structure coaxial with the longitudinal axis;
   a plurality of longitudinally extending buffer tubes disposed around the central strength member structure in a single layer with each tube in contact with a pair of adjacent tubes and in contact with the strength member structure, the number of buffer tubes being four and each tube having a bore of a predetermined size;
   a plurality of optical fiber ribbons in a stack in the bore of each of said tubes, each stack substantially filling, but being loosely received, in the bore of the tube in which the stack is received and each ribbon comprising a plurality of optical fibers in side-by-side relation and wherein the total number of optical fibers in the plurality of buffer tubes is greater than 1000; and
   a jacket encircling the plurality of buffer tubes, wherein the jacket has a thickness and the buffer tubes and the central strength member structure have respective outer diameters selected such that the sum of one-half the diameter of the central strength member structure, the outer diameters of the buffer tubes and the jacket thickness results in the cable having a fill factor not greater than about 85% in a two inch duct.

24. An elongated optical fiber cable as set forth in claim 23 wherein the number of optical fibers is more than 1500 and the fill factor not greater than 65% in a two-inch duct.

25. An elongated optical fiber cable as set forth in claim 23 wherein the number of optical fibers is more than 1500 and the fill factor is not greater than about 85% in a one-and one-half inch duct.

26. An elongated optical fiber cable as set forth in claim 23 wherein the number of optical fibers is more than 2000 and the fill factor is not greater than about 80% in a two-inch duct.

27. An optical fiber cable as set forth in claim 23 wherein there are interstices within the jacket which are intermediate pairs of buffer tubes and which are also intermediate such pairs of buffer tubes and the jacket and further comprising additional optical fibers in at least one of the interstices.

28. An optical fiber cable as set forth in claim 27 wherein the number of optical fibers is more than 1800 and the fill factor is not greater than 85% in a one-and one-half inch duct.

29. An optical fiber cable as set forth in claim 27 wherein the additional optical fibers are loosely received in a buffer tube which is loosely received in the interstice.

30. An optical fiber as set forth in claim 23 wherein each of the ribbons in each stack comprises twenty-four optical fibers, wherein the cable comprises additional optical fiber ribbons with a lesser number of optical fibers than contained in the ribbons of the respective stacks and which are disposed at at least one end of each stack and wherein the number of optical fibers is more than 1800 and the fill factor is not greater than 85% in a one-and one-half inch duct.

* * * * *

UNITED STATES PATENT AND TRADEMARK OFFICE
CERTIFICATE OF CORRECTION

PATENT NO. : 6,870,995 B2
DATED : March 22, 2005
INVENTOR(S) : Johnson et al.

It is certified that error appears in the above-identified patent and that said Letters Patent is hereby corrected as shown below:

<u>Column 4,</u>
Lines 37-38, "space bound by" should read -- space bounded by --

<u>Column 9,</u>
Table 2, column 1, "2 inch duct)" should read -- (2 inch duct) --

<u>Column 11,</u>
Line 16, "said tubes each stack" should read -- said tubes, each stack --
Line 18, "the stuck is received" should read -- the stack is received --

Signed and Sealed this

Seventh Day of June, 2005

JON W. DUDAS
*Director of the United States Patent and Trademark Office*